(12) United States Patent
Miyazaki

(10) Patent No.: US 10,514,292 B2
(45) Date of Patent: Dec. 24, 2019

(54) OPTICAL PROBE AND MEASURING APPARATUS UTILIZING RESONANT SCANNERS DRIVEN IN SYNCHRONIZATION WITH SEPARATE AND COAXIAL DRIVE AXES

(71) Applicant: MITUTOYO CORPORATION, Kawasaki-shi, Kanagawa (JP)

(72) Inventor: Masahito Miyazaki, Kawasaki (JP)

(73) Assignee: MITUTOYO CORPORATION, Kanagawa (JP)

(*) Notice: Subject to any disclaimer, the term of this patent is extended or adjusted under 35 U.S.C. 154(b) by 170 days.

(21) Appl. No.: 15/166,938

(22) Filed: May 27, 2016

(65) Prior Publication Data

US 2016/0377478 A1     Dec. 29, 2016

(30) Foreign Application Priority Data

Jun. 29, 2015   (JP) .................................. 2015-130245

(51) Int. Cl.
| | |
|---|---|
| *G01J 1/04* | (2006.01) |
| *G02B 26/12* | (2006.01) |
| *G02B 26/10* | (2006.01) |
| *G01S 7/497* | (2006.01) |
| *G01S 7/481* | (2006.01) |
| *G01S 17/48* | (2006.01) |
| *G01S 17/42* | (2006.01) |

(52) U.S. Cl.
CPC ........... *G01J 1/0403* (2013.01); *G01S 7/4817* (2013.01); *G01S 7/4972* (2013.01); *G01S 17/42* (2013.01); *G01S 17/48* (2013.01); *G02B 26/105* (2013.01); *G02B 26/127* (2013.01)

(58) Field of Classification Search
CPC ... G01J 1/0403; G02B 26/127; G02B 26/105; G01S 7/4972; G01S 7/48; G01S 7/42; G01S 7/4817; G01S 17/48; G01S 17/42; G01B 11/005

See application file for complete search history.

(56) References Cited

U.S. PATENT DOCUMENTS

| | | | | |
|---|---|---|---|---|
| 5,629,790 A | * | 5/1997 | Neukermans | G02B 26/0841 250/234 |
| 5,764,398 A | * | 6/1998 | Hayakawa | G02B 26/085 235/462.36 |
| 5,767,666 A | * | 6/1998 | Asada | G02B 26/0816 324/97 |
| 9,784,838 B1 | * | 10/2017 | Shpunt | G01S 17/89 |

(Continued)

FOREIGN PATENT DOCUMENTS

JP      2002-116010      4/2002

*Primary Examiner* — Que Tan Le
*Assistant Examiner* — Jennifer D Bennett
(74) *Attorney, Agent, or Firm* — Greenblum & Bernstein, P.L.C.

(57) ABSTRACT

An optical probe includes a first resonant scanner having a first mirror capable of rotating centered around a drive axis, the first resonant scanner reflecting emitted light from a light source toward a measured object, and a second resonant scanner having a second mirror capable of rotating centered around the drive axis, the second resonant scanner reflecting light reflected from the measured object toward a photoreceiver. The first mirror and the second mirror are rotationally driven in synchronization.

23 Claims, 7 Drawing Sheets

(56) References Cited

U.S. PATENT DOCUMENTS

| | | | |
|---|---|---|---|
| 2003/0090771 A1* | 5/2003 | Sakai | G02B 7/1821 359/199.3 |
| 2009/0284190 A1* | 11/2009 | Matsubara | G02B 26/085 318/114 |
| 2010/0271616 A1* | 10/2010 | Suzuki | G01B 11/24 356/5.01 |
| 2014/0153001 A1* | 6/2014 | Chayat | G01S 17/89 356/612 |
| 2015/0204977 A1* | 7/2015 | Sakai | G01S 17/42 356/4.01 |

* cited by examiner

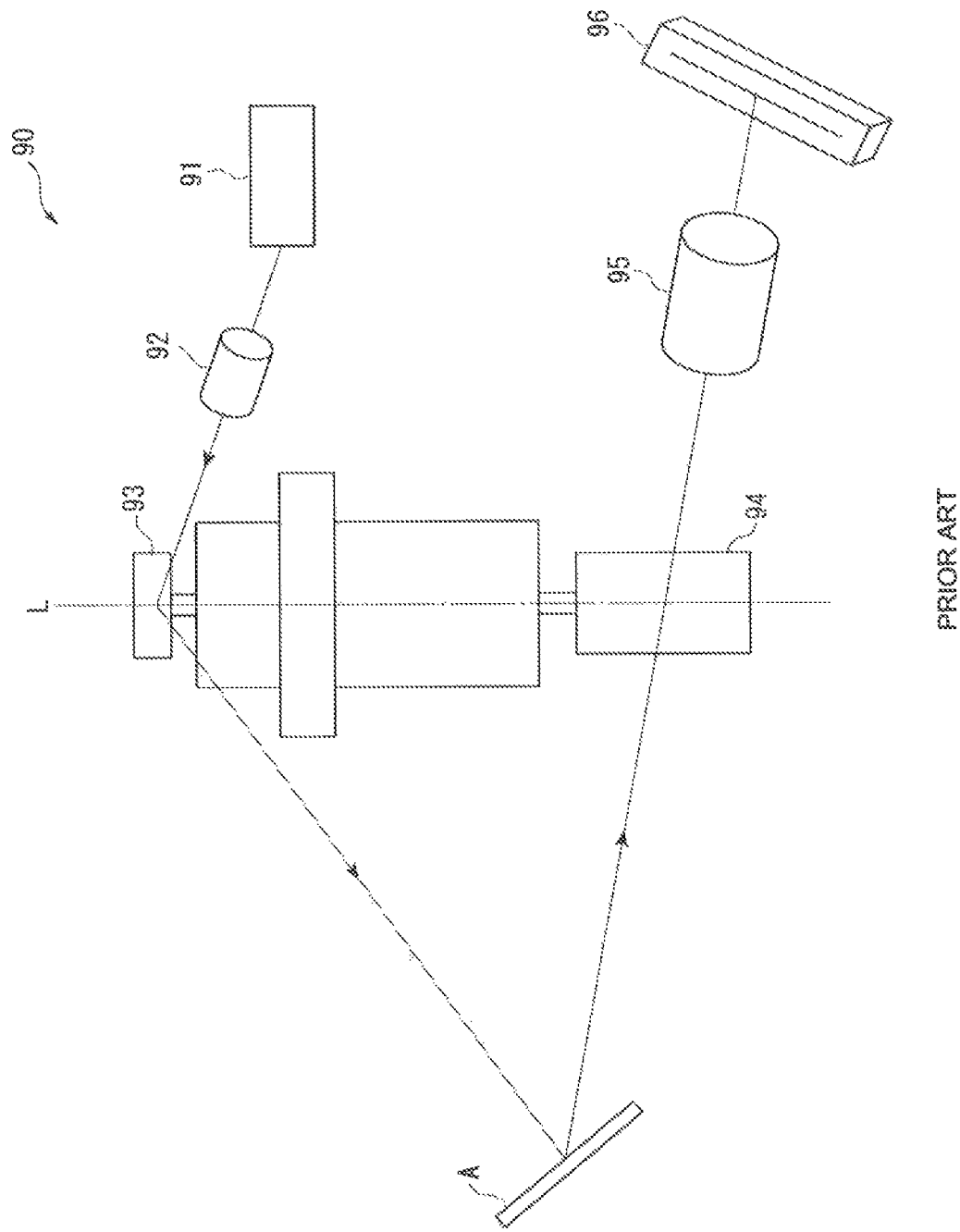

OPTICAL PROBE AND MEASURING APPARATUS UTILIZING RESONANT SCANNERS DRIVEN IN SYNCHRONIZATION WITH SEPARATE AND COAXIAL DRIVE AXES

CROSS-REFERENCE TO RELATED APPLICATIONS

The present application claims priority under 35 U.S.C. § 119 of Japanese Application No. 2015-130245, filed on Jun. 29, 2015, the disclosure of which is expressly incorporated by reference herein in its entirety.

BACKGROUND OF THE INVENTION

1. Field of the Invention

The present invention relates to an optical probe emitting light toward a measured object and receiving light reflected by the measured object, and also relates to a measuring apparatus.

2. Description of Related Art

Conventionally, an optical probe is known which emits light toward a measured object and receives light reflected by the measured object, and in addition, the optical probe is capable of changing a firing direction of the light (see, for example, Japanese Patent Laid-open Publication No. 2002-116010). A coordinate measuring device described in Japanese Patent Laid-open Publication No. 2002-116010 includes an optical probe, and the optical probe is provided with a galvano-mirror changing the firing direction of emitted light. By changing the firing direction of the light with the galvano-mirror, scanning of the measured object is performed.

In addition, the optical probe described in Japanese Patent Laid-open Publication No. 2002-116010 performs a shape measurement with a single galvano-mirror by defining emitted light, returning return light to an original optical path by the galvano-mirror, and receiving interference light which combines the return light and reference light. In contrast, an optical probe with a configuration shown in FIG. 7 is known. FIG. 7 illustrates an example of a conventional optical probe. The optical probe in FIG. 7 measures a distance between an optical probe 90 and a measured object A by a triangulation method using a pair of galvano-mirrors 93 and 94, and measures a shape of a measured object from data of a position of the optical probe 90. In such an optical probe, laser light emitted from a laser light source 91 is made parallel by a collimating lens 92 and is reflected by an incident side galvano-mirror 93 toward the measured object A. In addition, the return light reflected by the measured object A is reflected by a receiving side galvano-mirror 94, then is received at an image sensor 96 from a collecting lens 95. In this way, highly accurate measurement is possible by synchronously driving the incident side galvano-mirror 93 and the receiving side galvano-mirror 94.

In the examples shown in Japanese Patent Laid-open Publication No. 2002-116010 and FIG. 7, a galvano-mirror is used as a mechanism to perform a scanning process on the measured object by oscillating the emitted light. However, such a galvano-mirror is configured to drive a mirror with a motor so there is a limit to a size and weight reduction. Therefore, in the coordinate measuring device, for example, when using a measuring apparatus of an arm type in which an optical probe is mounted on a forefront end of a multijoint arm, weight burden is increased and operability is affected when an operator operates the optical probe by hand. In addition, for example, in a measuring apparatus of a stage-type in which a displacement mechanism is provided moving the optical probe on the stage in three axis directions and the optical probe is moved automatically, there is a load limit to the optical probe and moving accuracy is reduced when exceeding the load limit.

SUMMARY OF THE INVENTION

The present invention provides an optical probe which is capable of being reduced in size and weight, and also provides a measuring apparatus.

An optical probe according to the present invention includes a first resonant scanner having a first mirror capable of rotating centered around a drive axis, the first resonant scanner reflecting emitted light from a light source toward a measured object, and a second resonant scanner having a second mirror capable of rotating centered around the drive axis, the second resonant scanner reflecting light reflected from the measured object toward a photoreceiver. The first mirror and the second mirror are synchronously rotated.

In the present invention, the first mirror of the first resonant scanner and the second mirror of the second resonant scanner are rotatable coaxially and these mirrors are rotationally driven in synchronization. Accordingly, the emitted laser light from reflection by the first mirror of the first resonant scanner can be scanned on a line and reflected laser light from a scanning position can be accurately led by the second mirror of the second resonant scanner to the photoreceiver such as an image sensor. In a configuration using this type of resonant scanner, compared to a configuration using a conventional galvano-motor, size and weight reduction becomes possible, enabling the size and weight reduction of the optical probe to be promoted. Therefore, for example, in an arm-type measuring apparatus in which an optical probe is provided to the forefront end of the multi-joint arm and the operator moves the optical probe, the weight reduction reduces a burden on the operator and operability can be improved. Further, for example, in a stage-type measuring apparatus, an optical probe within a load limit which is capable of being borne by a displacement mechanism of the stage can be provided with a simple configuration. Therefore, moving accuracy of the displacement mechanism is improved and accurate measurement also can be achieved. Furthermore, in contrast to an optical probe using a galvano-mirror scanning emitted light by driving a motor, the resonant scanner scans the emitted light by electromagnetic resonance, and faster scanning becomes possible.

Preferably, the optical probe according to the present invention includes a tilt angle detector detecting a tilt angle of at least one of the first mirror and the second mirror. In the present invention, the tilt angle detector detects the tilt angle of at least one of the first mirror and the second mirror. In this example, as mentioned above, the first mirror and the second mirror are driven centered around the same drive axis and are synchronously driven. Therefore, when the tilt angle of one of the first mirror and the second mirror is determined, the tilt angle of the other is similarly determined. In addition, tilt angles of both the first mirror and the second mirror may be detected. In the present invention, each tilt angle can be detected when the first mirror and the second mirror are driven, and with these tilt angles, an emission angle of laser light and an incident angle of return light can be readily determined, and therefore a scanning position of the measured object can readily be detected.

In the optical probe according to the present invention, the tilt angle detector preferably includes at least one of a first detection coil and a second detection coil. The first detection coil outputs an electric current corresponding to the tilt angle of the first mirror and the second detection coil outputs an electric current corresponding to the tilt angle of the second mirror. For detecting the tilt angle of the mirror in the resonant scanner, examples such as detecting the tilt of the mirror by a strain gage or detecting an electric current value of a piezo element provided to the mirror can be considered, however, a complex configuration and detection accuracy are concerns. In contrast, the present invention detects an electric current signal generated by electromagnetic induction associated with driving oscillation of the mirror using the first detection coil and the second detection coil. Such an electric current signal has a signal level associated with the tilt angle of the mirror (amplitude of an electric current waveform), and therefore the tilt angle for each mirror can readily be detected by detecting the signal level of the electric current signal. Accordingly, the scanning position on the measured object can readily be identified.

In the optical probe according to the present invention, the tilt angle detector is preferably provided with the first detection coil outputting the electric current corresponding to the tilt angle of the first mirror and the second detection coil outputting the electric current corresponding to the tilt angle of the second mirror. In the present invention, both the first detection coil and the second detection coil mentioned above are provided. Therefore, the electric current signal from the first detection coil is compared with the electric current signal from the second detection coil and then a determination is made as to whether there is a phase shift. Accordingly, a determination can be made as to whether the first mirror and the second mirror are synchronously driven. Particularly, in a calibration process performed prior to the measurement using the optical probe, a decrease in measurement accuracy can be prevented from occurring by performing the determination above.

The measuring apparatus according to the present invention includes the optical probe described above and a measurer performing a measurement process based on a measurement result of the optical probe. Further, the measurement result by the optical probe is measurement data showing a measurement position of the light received from the photoreceiver and the like. For example, when the image sensor receives the light, the measurement result is captured image data of the light. In the present invention, similar to the optical probe mentioned above, reduction in size and weight becomes possible compared to the conventional configuration using the galvano-motor. Accordingly, the arm-type measuring apparatus enables reducing the operator burden and the stage-type measuring apparatus can improve measurement accuracy. Moreover, high speed scanning measurement becomes possible, and therefore an amount of time spent in measurement can be reduced. Furthermore, many more frames can be captured in a short period of time and highly accurate measurement based on these frames can be performed.

In the measuring apparatus according to the present invention, the optical probe includes at least one of the first detection coil outputting the electric current corresponding to the tilt angle of the first mirror and the second detection coil and the second detection coil outputting the electric current corresponding to the tilt angle of the second mirror. Preferably, the measurer detects the scanning position on the measured object based on at least one of the electric current signal output from the first detection coil and the electric current signal output from the second detection coil. In the present invention, as described above, based on the electric current signal output from the first detection coil or the second detection coil, the position (scanning position) where the emitted light fired from the optical probe is reflected by the measured object can be readily and accurately detected.

In the measuring apparatus according to the present invention, the optical probe includes the first detection coil outputting the electric current corresponding to the tilt angle of the first mirror and the second detection coil outputting the electric current corresponding to the tilt angle of the second mirror. Preferably, based on the respective electric current signals output from the first detection coil and the second detection coil, a phase shift detector detecting a phase shift of the first mirror and the second mirror is provided. In the present invention, the phase shift detector can determine whether synchronization is correctly performed for the first mirror and the second mirror by detecting the electric current signal from the detection coil provided to each resonant scanner.

The present invention enables size and weight reduction of the optical probe to be promoted.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 illustrates a schematic configuration of a conventional optical probe.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a measuring apparatus (a coordinate measuring apparatus) according to an embodiment of the present invention is described with reference to the drawings.

[Configuration of Measuring Apparatus]

Figure 1:
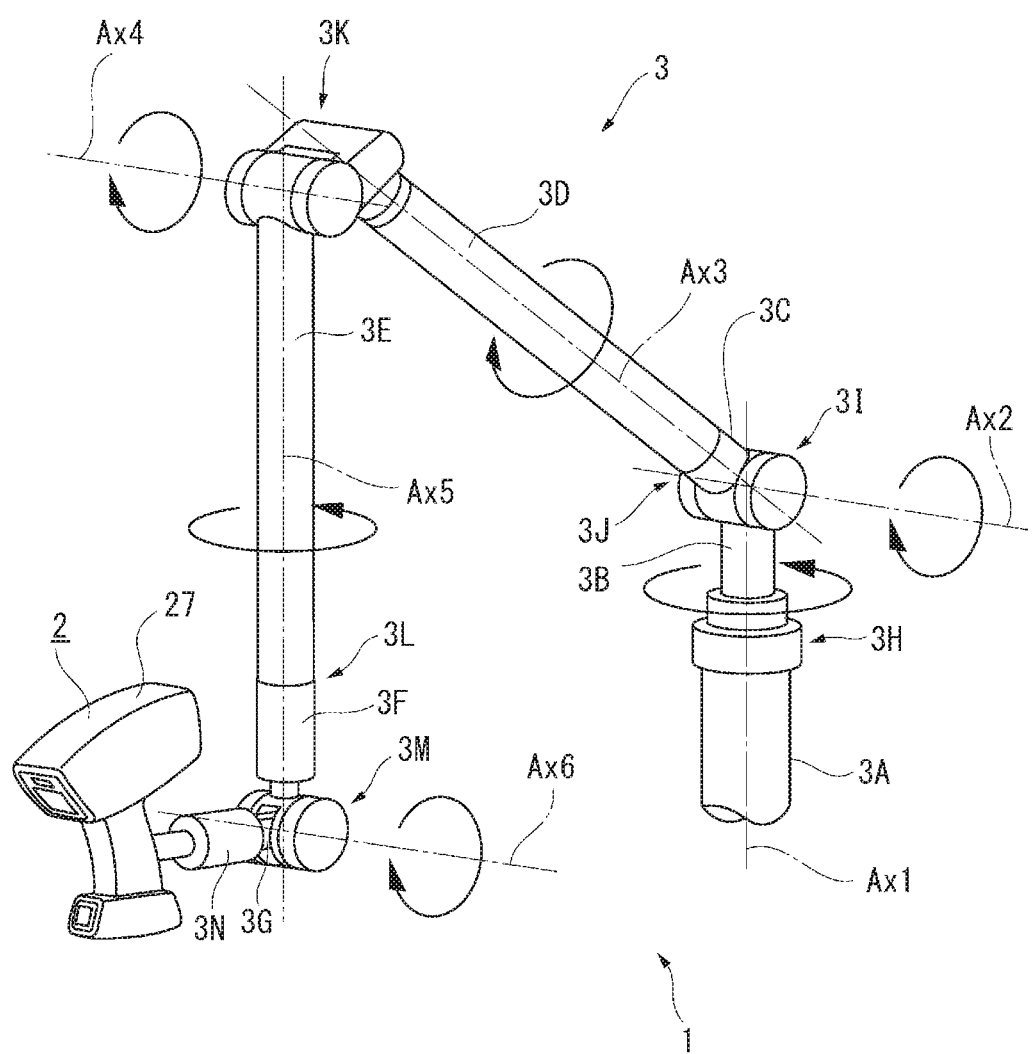
FIG. 1 illustrates a schematic configuration of a measuring apparatus according to one embodiment of the present invention.

FIG. 1 illustrates a schematic configuration of the measuring apparatus according to one embodiment of the present invention. A measuring apparatus 1 is a coordinate measuring apparatus and is configured to be capable of direct manual movement of an optical probe 2 by an operator. By capturing a measurement result (measurement data) by the optical probe 2, measurements of a three-dimensional shape, a surface texture, and the like of a measured object are performed. As shown in FIG. 1, the coordinate measuring apparatus 1 is configured to include the optical probe 2, a multijoint arm 3, an angle sensor 4 (see FIG. 3), and a control device 5 (see FIG. 3).

The multijoint arm 3 is configured to support the optical probe 2 and also to be capable of moving the optical probe 2 with respect to an external force (operation by the operator) within a three-dimensional space. As shown in FIG. 1, the multijoint arm 3 includes, for example, a support pillar 3A in a circular column shape, a first link 3B through a sixth link 3G in a circular column shape, a first joint portion 3H through a sixth joint portion 3M, and a probe head 3N. The support pillar 3A is fixated to a work bench and the like so as to align with a first axis Ax1. The first joint portion 3H connects the support pillar 3A and a first end of the first link 3B in a state where the first link 3B is aligned in a vertical direction along the first axis Ax1, for example. In addition, by connecting the first link 3B to the support pillar 3A via the first joint portion 3H, the first link 3B is capable of rotating centered on the first axis Ax1 with respect to the support pillar 3A.

The second joint portion 3I connects a second end of the first link 3B and a first end of the second link 3C. The first link 3B and the second link 3C are connected to each other by the second joint portion 3I, and thus the first link 3B and the second link 3C are capable of relative rotation centered on a second axis Ax2 aligned with a horizontal plane, for example. The third joint portion 3J connects a second end of the second link 3C and a first end of the third link 3D in a state where a center axis Ax3 of each link is mutually aligned. The second link 3C and the third link 3D are connected to each other by the third joint portion 3J, and thus the second link 3C and the third link 3D are capable of relative rotation centered on the center axis Ax3. A fourth joint portion 3K connects a second end of the third link 3D and a first end of the fourth link 3E. The third link 3D and the fourth link 3E are connected to each other by the fourth joint portion 3K, and thus the third link 3D and the fourth link 3E are capable of relative rotation centered on a third axis Ax4 which is orthogonal to the center axis Ax3.

The fifth joint portion 3L connects a second end of the fourth link 3E and a first end of the fifth link 3F in a state where a center axis Ax5 of each link is mutually aligned. The fourth link 3E and the fifth link 3F are connected to each other by the fifth joint portion 3L, and thus the fourth link 3E and the fifth link 3F are capable of relative rotation centered on the center axis Ax5. The sixth joint portion 3M connects a second end of the fifth link 3F and a first end of the sixth link 3G. The fifth link 3F and the sixth link 3G are connected to each other by the sixth joint portion 3M, and thus the fifth link 3F and the sixth link 3G are capable of relative rotation centered on a fourth axis Ax6 which is orthogonal to the center axis Ax5. As described above, the multijoint arm 3 is configured to be operable with a plurality of axes (six axes according to the present embodiment). The probe head 3N is attached to a second end of the sixth link 3G and the optical probe 2 is attachably and detachably supported.

Although not specifically depicted in the drawings, the angle sensor 4 is attached to each of the first joint portion 3H through the sixth joint portion 3M respectively. In addition, the six angle sensors 4 detect a relative rotation angle of the first link 3B through the sixth link 3G, which are connected to one another by the first joint portion 3H through the sixth joint portion 3M. For example, the angle sensor 4 provided to the first joint portion 3H detects the relative rotation angle centered on the first axis Ax1 belonging to both the support pillar 3A and the first link 3B.

[Configuration of Optical Probe 2]

Figure 2:
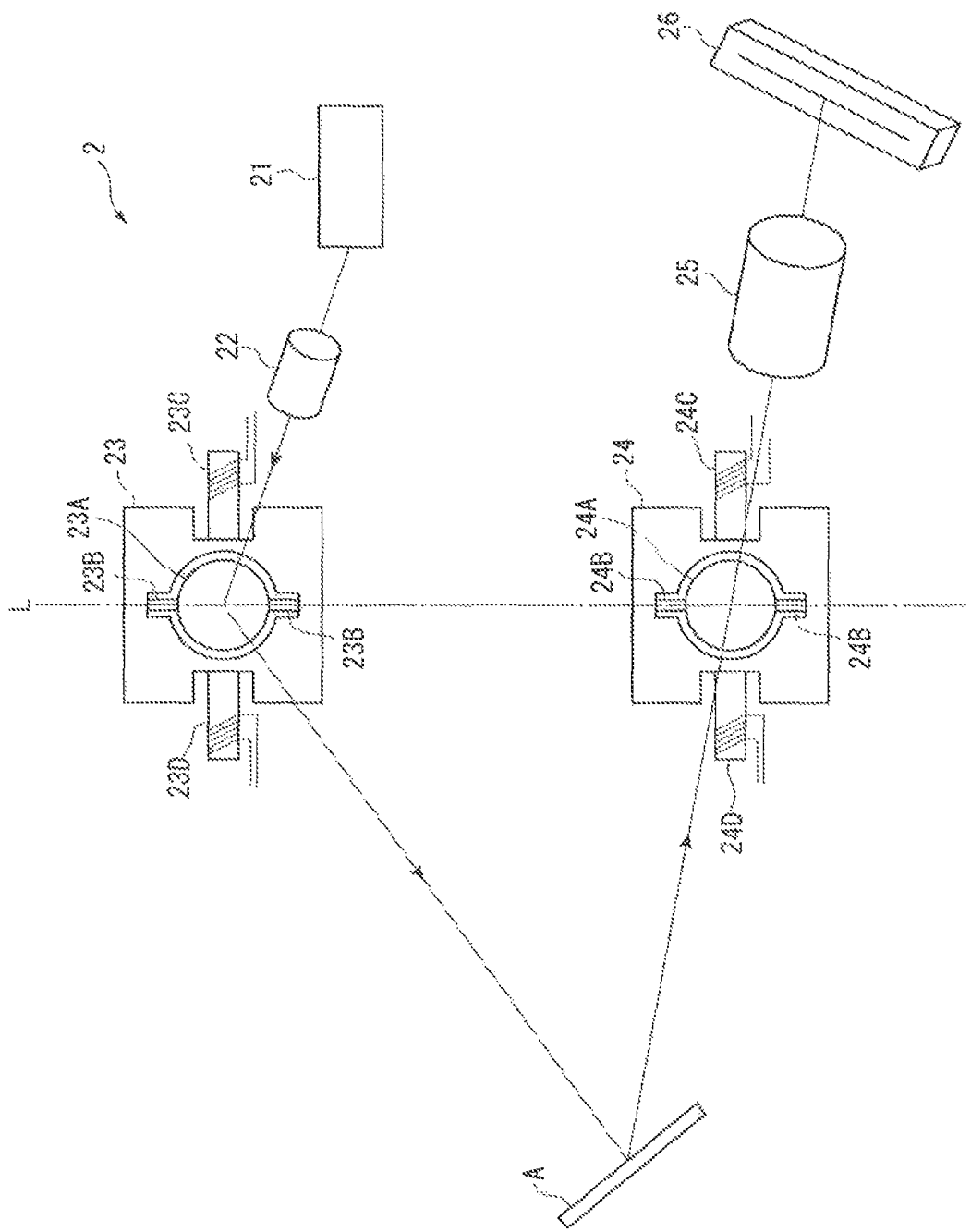
FIG. 2 illustrates a schematic configuration of an optical probe according to the embodiment.

Next, a configuration of the optical probe 2 is described. FIG. 2 illustrates a schematic configuration of the optical probe 2. The optical probe 2 is configured with a laser probe which fires the laser light (emitted light) at a measured object A and detects the laser light reflected by the measured object A. The optical probe 2 is configured to include a laser light source 21 (light source), a collimating lens 22, a first resonant scanner 23, a second resonant scanner 24, a collecting lens 25, an image sensor 26 (photoreceiver), and an external casing 27 housing these various members.

In the present embodiment, the laser light source 21 is a semiconductor laser, for example, and fires the laser light. The laser light fired from the laser light source 21 is rendered as parallel light by the collimating lens 22, is reflected by a mirror (first mirror 23A) of the first resonant scanner 23, and is emitted from the optical probe 2. The reflected light which is fired from the optical probe 2 and reflected by the measured object A is input to the optical probe 2 again, is reflected by a mirror (second mirror 24A) of the second resonant scanner 24 and input to the collecting lens 25, and is collected in the image sensor 26 by the collecting lens 25.

The first resonant scanner 23 includes the first mirror 23A, a first beam 23B, a first drive coil 23C, and a first detection coil 23D. The first mirror 23A is formed in a shape symmetrical with respect to a drive axis L (such as circular shape, rectangular shape, or the like) and is supported by the first beam 23B so as to be capable of rotating centered on the drive axis L. The first beam 23B is configured by a torsion spring, for example, and the first mirror 23A is rotatably supported along the drive axis L as described above. In addition, on a rear surface on the opposite side from a light reflecting surface of the first mirror 23A, a small magnet is provided on the drive axis L. The magnet has different magnetic poles on each of the first drive coil 23C side and the first detection coil 23D side (of the magnet). For example, the first drive coil 23C side is the south pole and the first detection coil 23D side is the north pole. The first drive coil 23C is arranged on a first side of the first mirror 23A and the first detection coil 23D is arranged on a second side, each on opposite sides of the drive axis L.

In the first resonant scanner 23 with such a configuration, alternating current flows from a first driver 51 (see FIG. 3) to the first drive coil 23C. When a frequency of the alternating current matches a natural frequency of a machine system configured by the small magnet of the first beam 23B and the first mirror 23A, the first mirror 23A vibrates (oscillates) due to resonance. In addition, due to the vibration from the first mirror 23A, the electric current is output from the first detection coil 23D by changing the magnetic strength input to the first detection coil 23D. The electric current output is input to the control device 5 and thus the first resonant scanner 23 is feedback controlled. Additionally, in the present embodiment, the control device 5 detects the scanning position (position where the laser light is fired) on the measured object A based on the electric current value.

The second resonant scanner 24 has a similar configuration to that of the first resonant scanner 23 and includes a second mirror 24A, a second beam 24B, a second drive coil 24C, and a second detection coil 24D. The configuration of each component is similar to those mentioned in the first resonant scanner 23 above, so descriptions thereof are omitted. In addition, the second beam 24B of the second resonant scanner 24 is positioned coaxially with the drive axis L in the first resonant scanner 23. Therefore, the second mirror 24A is able to vibrate (oscillate) centered on the drive axis L which is the same axis as that of the first mirror 23A.

In the above, a configuration is described where the drive coils 23C and 24C and the detection coils 23D and 24D are provided at positions on opposite sides of the mirrors 23A and 24A, respectively. However, the configuration and the driving method of the resonant scanners 23 and 24 are not limited to this. For example, a coil may be arranged along an outer periphery of a mirror and be positioned between magnets arranged on opposite sides of the drive axis L. Then, a configuration may be used to oscillate the mirror by sending the drive current to the coil. In addition, an electrode (−) may be formed on the mirrors 23A and 24A, and a driving electrode (+) may be arranged at each of two areas on opposite sides of the drive axis L (configuration of an electrostatic resonant scanner). Furthermore, a known configuration of the resonant scanner can be used.

[Configuration of Control Device]

Figure 3:
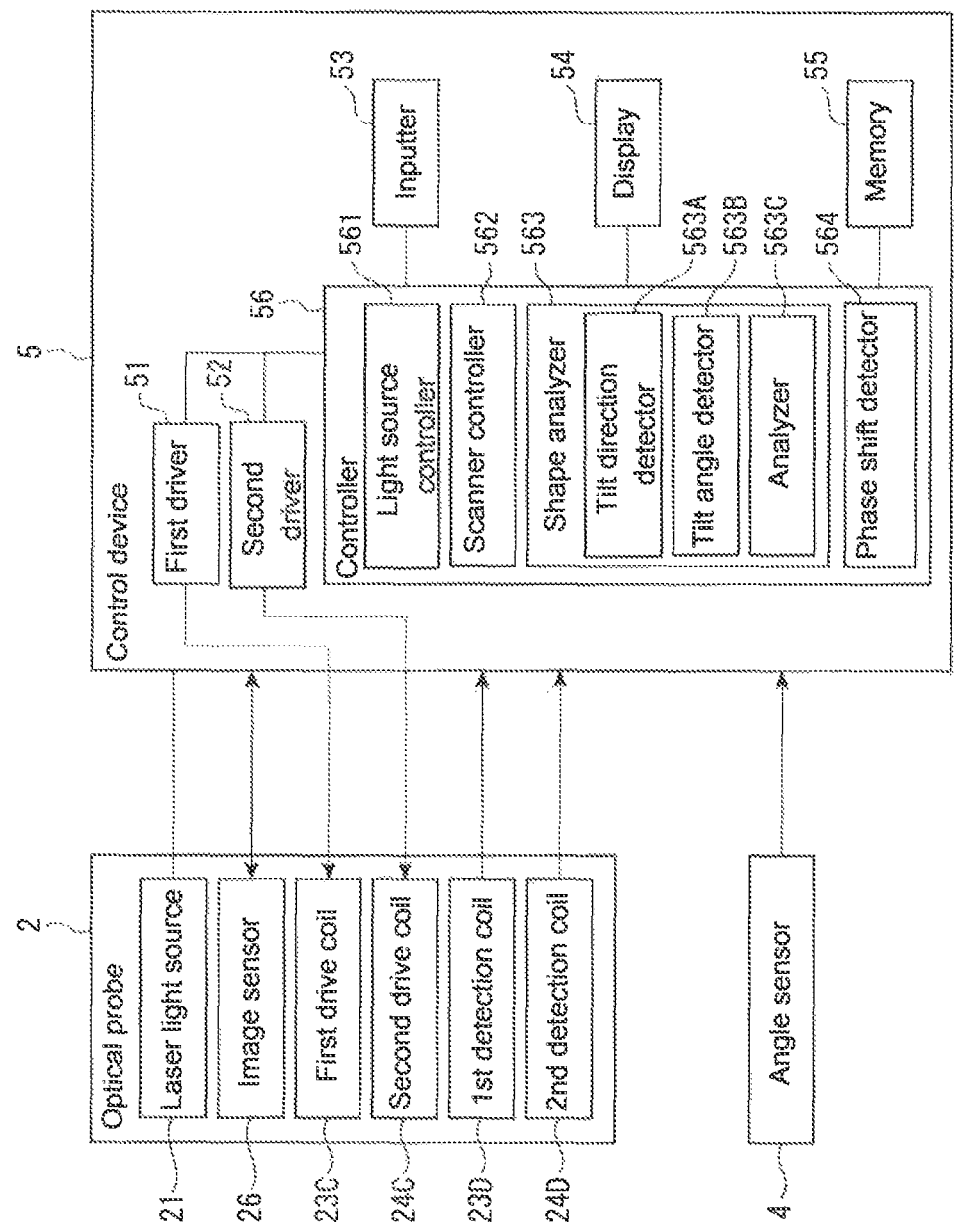
FIG. 3 is a block diagram illustrating a control configuration for the measuring apparatus according to the embodiment.

FIG. 3 is a block diagram illustrating a control structure of the measuring apparatus 1. As shown in FIG. 3, the control device 5 is configured to include an inputter 53 configured with the first driver 51, a second driver 52, a mouse, a keyboard, and the like; a display 54; a memory 55; and a controller 56. The first driver 51 sends the alternating current to the first drive coil 23C of the first resonant scanner 23 based on a command signal from the controller 56. The second driver 52 sends the alternating current to the second drive coil 24C of the second resonant scanner 24 based on the command signal from the controller 56. In this example, the command signal output from the controller 56 is input to the first driver 51 and the second driver 52 simultaneously. Accordingly, the electric current application to the first drive coil 23C from the first driver 51 and the electric current application to the second drive coil 24C from the second driver 52 are performed at the same time, and thus both the first resonant scanner 23 and the second resonant scanner 24 are driven in synchronization.

The memory 55 may be configured with a hard disk, a memory, and the like, and stores various programs and respective data in order to control the measuring apparatus 1. The controller 56 is configured with an operation circuit such as a CPU (Central Processing Unit) or a memory circuit, and reads and executes each program stored in the memory 55. Based on the measurement data of the optical probe 2 (image data detected by the image sensor 26) and the detection value of the angle sensor 4 (rotation angle), and the like, the controller 56 performs measurements of the three-dimensional shape, the surface texture, and the like of the measured object A. Specifically, the controller 56 serves, in cooperation with the various programs, as a light source controller 561, a scanner controller 562, a shape analyzer 563 (scanning position detector), a phase shift detector 564, and the like.

The light source controller 561 controls a firing status of the laser light of the optical probe 2 (laser light source 21). The scanner controller 562 controls the first resonant scanner 23 and the second resonant scanner 24 and scans the laser light across the measured object A. Specifically, the scanner controller 562 outputs the drive command signal for the drive coils 23C and 24C to the first driver 51 and the second driver 52 simultaneously. Accordingly, as described above, the alternating current flows to the first drive coil 23C and the second drive coil 24C from the first driver 51 and the second driver 52, and the first resonant scanner 23 (first mirror 23A) and the second resonant scanner 24 (second mirror 24A) are driven to oscillate in synchronization.

The shape analyzer 563 is a measurer of the present invention and detects the position of the laser light (scanning position) fired at the measured object A from the optical probe 2 based on the electric current signal detected by the detection coils 23D and 24D, and analyzes the shape of the measured object A (measuring process). Specifically, the shape analyzer 563 serves as a tilt direction detector 563A, a tilt angle detector 563B, and an analyzer 563C. Moreover, in the present embodiment, the first mirror 23A of the first resonant scanner 23 and the second mirror 24A of the second resonant scanner 24 are positioned on the same axis and are driven to oscillate so as to have the same tilt angle in synchronization. Therefore, the scanning position may be detected using the electric current signal from the first detection coil 23D, the second detection coil 24D, or both.

Figure 4:
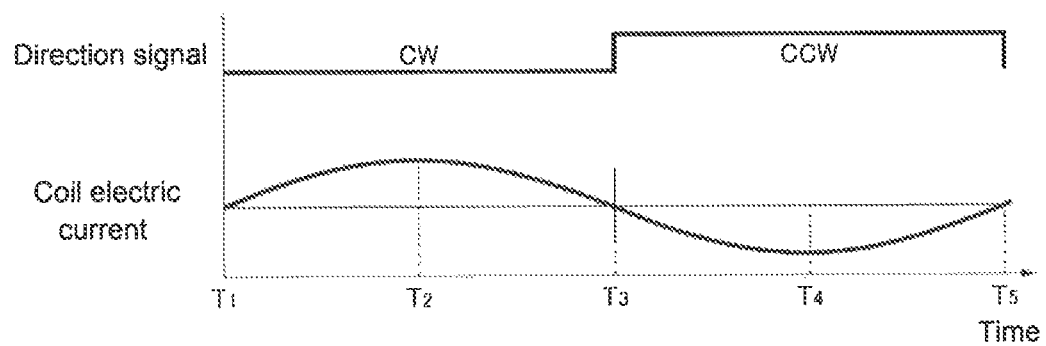
FIG. 4 illustrates an electric current signal input from a detection coil and a rotation direction of a mirror (direction signal)

FIG. 4 illustrates the electric current signal input from the detection coils 23D and 24D and the angle signal indicating the oscillation direction of the mirrors 23A and 24A (direction signal). In the resonant scanners 23 and 24, by sending the alternating current to the drive coils 23C and 24C, the mirrors 23A and 24A oscillate periodically, centered on the drive axis L. Therefore, the electric current signal in a sine-shaped wave shown in FIG. 4 is output from the detection coils 23D and 24D. In FIG. 4, when a tilt angle θ of the mirrors 23A and 24A is rotated from the Maximum tilt angle ($\theta = +\theta_1$) to the minimum tilt angle ($\theta = -\theta_1$), an electric current signal having a positive amplitude level is output from the detection coils 23D and 24D as shown in time stamps T1 to T3 in FIG. 4. Moreover, at the time stamp T2, the tilt angle θ of the mirrors 23A and 24A is θ=0°. On the other hand, when the tilt angle θ of the mirrors 23A and 24A is rotated from the minimum tilt angle ($\theta = -\theta_1$) to the maximum tilt angle ($\theta = +\theta_1$), an electric current signal having a negative amplitude level is output from the detection coils 23D and 24D as shown in time stamps T3 to T5 in FIG. 4. Moreover, at the time stamp T4, the tilt angle θ of the mirrors 23A and 24A is θ=0°. Therefore, by determining whether the electric current signal output is positive or negative, the rotation direction of the mirrors 23A and 24A can be detected. In addition, when the tilt angle θ of the mirrors 23A and 24A is detected, the direction in which the laser light is fired from the optical probe 2 and an incident direction, to the optical probe 2, of the reflected light reflected by the measured object are identified. Therefore, based on these detected angles, the scanning position on the measured object (a point where the laser light is fired) can be detected from the optical probe 2 with the triangulation method, for example.

In other words, in the tilt direction detector 563A of the shape analyzer 563, the mirrors 23A and 24A output a CW (Clock Wise) signal when the signal level has a positive value and output a CCW (Counter Clock Wise) signal when the signal level has a negative value.

The tilt angle detector 563B detects the tilt angle based on the electric current signal and the angle signal from each of the detection coils 23D and 24D. For example, when the angle signal is the CW signal and a differential signal of the electric current output from the detection coils 23D and 24D has a positive value, the tilt angle θ is determined as $0 < \theta \leq \theta_1$ while the tilt angle θ is determined as 0>θ≤−θ$_1$ when the differential signal has a negative value. Similarly, when the angle signal is the CCW signal and the differential signal of the electric current output from the detection coils 23D and 24D has a positive value, the tilt angle θ is determined as 0<θ≤θ$_1$ while the tilt angle θ is determined as 0>θ≥−θ$_1$ when the differential signal has a negative value. In addition, the memory 55 stores data of the tilt angle with respect to the signal level (absolute value) of the electric current signal output from the detection coils 23D and 24D, and the tilt angle detector 563B detects the tilt angle of the mirrors 23A and 24A based on the data and the signal level of the electric current signal. Moreover, the analyzer 563C calculates a three-dimensional coordinate value (measured value) of the scanning position based on the tilt angle of the mirrors 23A and 24A, measurement data, detection value of the angle sensor 4, respective lengths of the first link 3B to the sixth link 3G (already known), and the like.

The phase shift detector 564 compares the electric current signal from the first detection coil 23D with the electric current signal from the second detection coil 24D, and detects whether there is a phase shift in driving the first mirror 23A and the second mirror 24A. In other words, the phase shift detector 564 determines whether the mirrors 23A and 24A match each other at the time stamps T1, T2, T3, T4, and T5 in FIG. 4.

[Operation of Measuring Apparatus]

Figure 5:
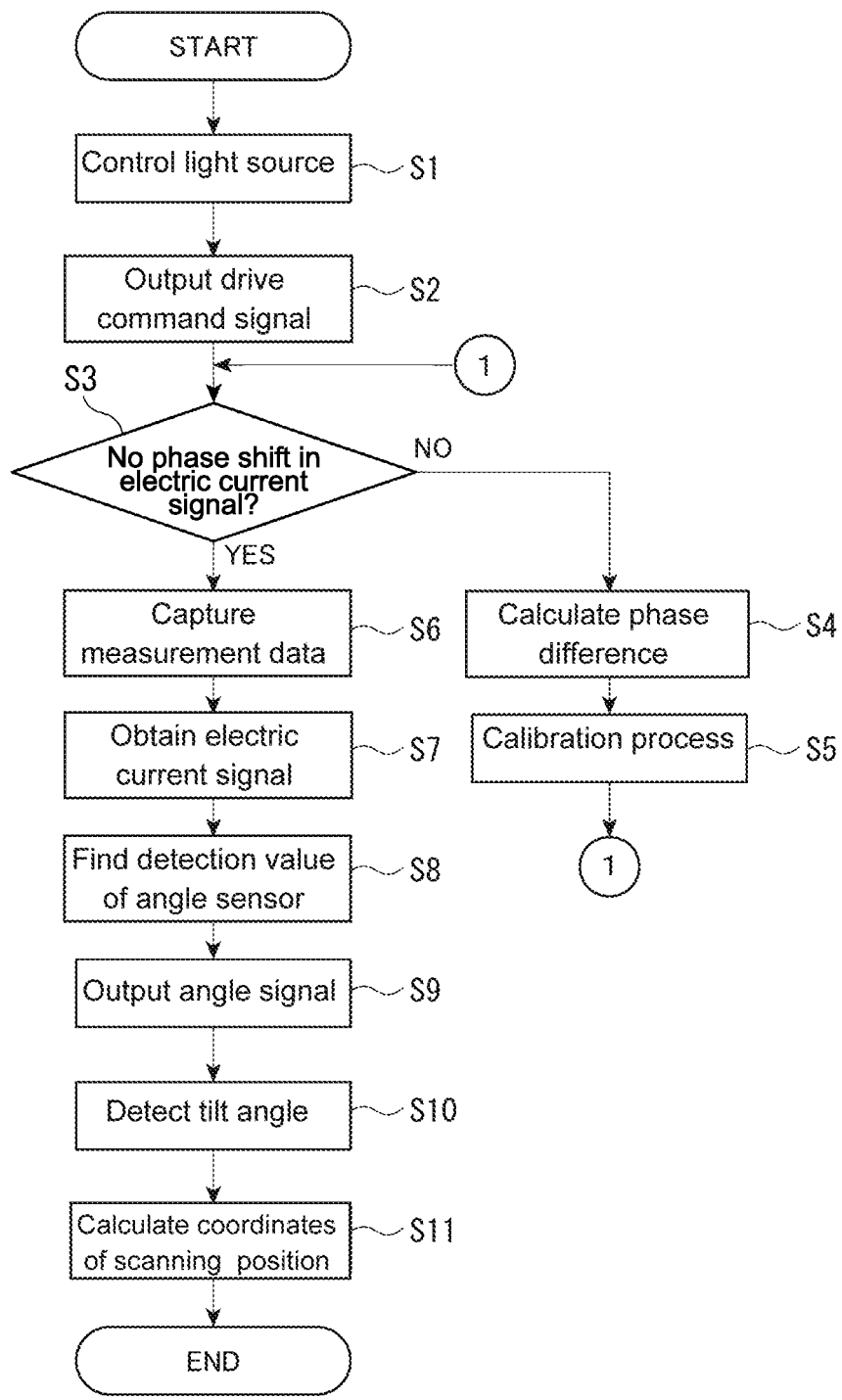
FIG. 5 is a flow chart describing operations of the measuring apparatus.

Next, operations of the measuring apparatus 1 are described with reference to the drawings. FIG. 5 is a flow chart describing the operations of the measuring apparatus 1. When the operator operates the optical probe 2 and inputs an operation to start the measurement, the light source controller 561 controls the laser light source 21 and fires the laser light (step S1).

When the measurement starts in step S1, the scanner controller 562 outputs the driving command signal simultaneously to the first driver 51 and the second driver 52. Accordingly, the alternating current application from the first driver 51 to the first drive coil 23C and the alternating current application from the second driver 52 to the second drive coil 24C are performed simultaneously, and thus the first mirror 23A and the second mirror 24A are driven to resonate in synchronization on the same drive axis L. Accordingly, the laser light is line-scanned over the measured object A by the optical probe 2 (step S2).

In this example, the phase shift detector 564 detects respective electric current signals input from the detection coils 23D and 24D, and determines whether there is any phase shift (step S3). In step S3, in a case where the phase shift is found in the two electric current signals, the phase difference is calculated (step S4). The scanner controller 562 calculates a delay time based on the calculated phase difference, delays only by the delay time calculated from the timing of the drive command signal being output to the first driver 51, and outputs the drive command signal to the second driver 52 (step S5: calibration process). After step S5, the process returns to step S3. Moreover, when there is a phase shift in the electric current signals even after performing a plurality of calibration processes, the process may be interrupted and an error may be output on a presumption that the resonant scanners 23 and 24 have a structural abnormality.

In addition, in step S3, when there is determined to be no phase shift, the measurement is initiated. Specifically, the scanning measurement of the measured object A is performed by driving the resonant scanners 23 and 24 through control by the scanner controller 562, and the image data is captured in the control device 5 by receiving the light reflected by the measured object A in the image sensor 26 (step S6). Moreover, at the same time as the measurement data is obtained in step S6, the control device 5 obtains the electric current signal from the first detection coil 23D (step S7). Furthermore, when these measurement data and the electric current signal are obtained, the control device 5 obtains the detection value detected by the angle sensor 4 (step S8).

After this step, the shape analyzer 563, using the tilt direction detector 563A, detects the rotation direction of the mirrors 23A and 24A based on the electric current signal obtained in step S7 and outputs the angle signal (CW signal or CCW signal) (step S9). In addition, the tilt angle detector 563B detects the tilt angle θ of the mirrors 23A and 24A using the angle signal, electric current signal, and stored data of the tilt angle of the mirrors 23A and 24A with respect to the signal level of the electric current signal stored in the memory 55 (step S10). The analyzer 563C calculates the three-dimensional coordinate value (measured value) of the scanning position of the laser based on the measured data captured in step S6, detection value of the angle sensor 4 obtained in step S7, the tilt angle of the mirrors 23A and 24A detected in step S10, and parameters already known (respective lengths of the first link 3B through the sixth link 3G, and the like) which are stored in the memory 55, for example (step S11).

Effects of the Embodiment

The measuring apparatus 1 according to the present embodiment includes the optical probe 2 and the control device 5. The optical probe 2 includes the first resonant scanner 23 having the first mirror 23A capable of rotating centered around the drive axis L and the second resonant scanner 24 having the second mirror 24A capable of rotating centered around the drive axis L. The first mirror 23A and the second mirror 24A are driven to oscillate in synchronization by the control from the control device 5. In other words, the tilt angle θ of the first mirror 23A and the tilt angle θ of the second mirror 24A always become the same angle. Accordingly, the reflected light from the first mirror 23A of the first resonant scanner 23 can be line-scanned on the measured object A. In addition, the light reflected at the scanning position can be accurately reflected toward the image sensor 26 by the second mirror 24A of the second resonant scanner 24 and highly accurate measurement data can be obtained. These resonant scanners 23 and 24 can be reduced in size and weight compared to the conventional galvano-mirror and promote the size and weight reduction of the optical probe 2. Specifically, in a case where a galvano-motor is used, although motor torque or the like may be an influence, the weight of the motor is between 80 and 100 g while the weight of the resonant scanner is 50 g or less, achieving weight reduction of the optical probe 2. Additionally, in the optical probe using the galvano-motor, the motor needs to be reduced in size and there are concerns such as an inability to obtain sufficient torque when the motor size is reduced. Further, a driving driver outputting electric power to drive the motor increases in size. In contrast, in the resonant scanner, the mirrors 23A and 24A are driven to resonate by a small change in a magnetic field, and therefore no motor is required. The size reduction of the optical probe 2 can be promoted and electric power savings also can be achieved. Accordingly, even when the optical probe 2 is attached to the forefront end of the multijoint arm 3 as described in the present invention and the operator manually moves the position of the optical probe 2, operator burden is reduced and operability can be improved.

In addition, when the mirror is driven by the conventional galvano-motor, the scanning speed is limited to several tens Hz whereas the resonant scanner can achieve a scanning speed of several hundreds Hz. In other words, the mirrors 23A and 24A can be driven to oscillate at high speed by electromagnetic resonance. Therefore, measurement accuracy can be improved in order to enable the scanning process using the laser light to be performed at high speed and more measurement data to be obtained within the measurement time. In addition, reducing the measurement time becomes possible.

In the present embodiment, the first resonant scanner 23 includes the first detection coil 23D outputting the electric signal associated with the oscillation drive of the first mirror 23A. The electric signal output from the first detection coil 23D has the signal level associated with the tilt angle θ of the first mirror 23A, and therefore by detecting the signal level of the electric signal, the tilt angle θ of the first mirror 23A can be readily calculated. Further, when the tilt angle θ of the first mirror 23A is calculated, the shape analyzer 563 can readily detect the scanning position by the triangulation method. Furthermore, by outputting the electric current signal from the first detection coil 23D to the control device 5, the control device 5 can control, based on the electric current signal, the drive command signal output to the first driver 51 and the second driver 52 and can control the drive status. In other words, with a closed-loop circuit, feedback control can be performed and the scanning accuracy of the laser light can be improved.

In the present embodiment, the second resonant scanner 24 includes the second detection coil 24D outputting the electric signal associated with the oscillation drive of the second mirror 24A. The phase shift detector 564 detects the electric signal from both the first detection coil 23D and the electric signal from the second detection coil 24D. Therefore, the phase shift detector 564 can determine whether these electric signals have a phase shift. When the phase shift exists, defining the delay time associated with the phase shift amount and the like by performing the calibration process can eliminate the phase shift between the first mirror 23A and the second mirror 24A and enable the mirrors 23A and 24A to be driven in synchronization.

[Modification]

Figure 6:
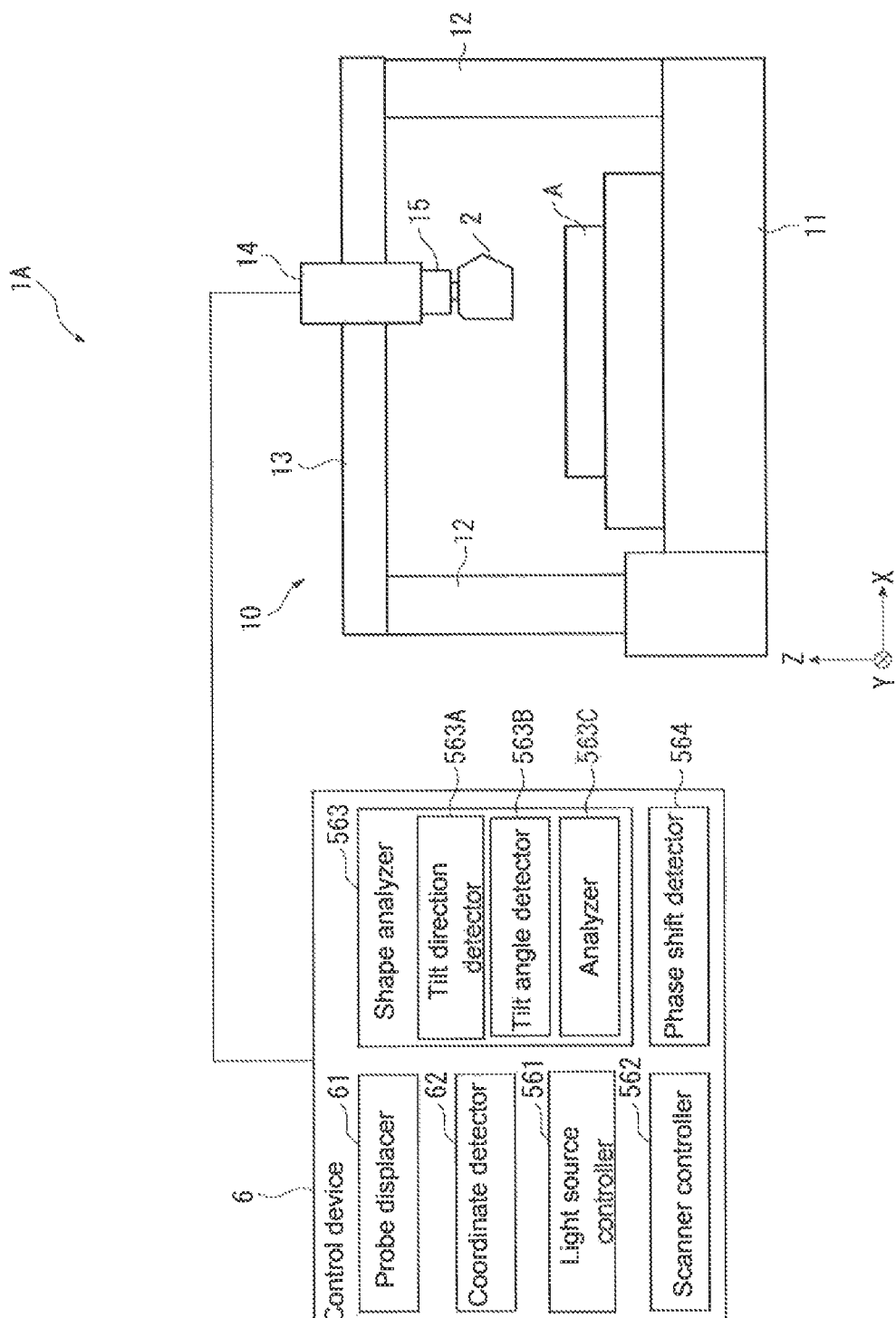
FIG. 6 illustrates a configuration of another measuring apparatus according to the present invention.

Moreover, the present invention is not limited to the above-described embodiment, and includes modifications and improvements within a scope capable of achieving the advantages of the present invention. In the embodiment above, an example of the measuring apparatus 1 is described in which the optical probe 2 is mounted to the forefront end of the multijoint arm 3. However, the present invention is not limited to this. FIG. 6 illustrates a stage-type measuring apparatus which is another example of a measuring apparatus of the present invention. A measuring apparatus 1A shown in FIG. 6 includes a measuring apparatus main body 10 and a control device 6. The measuring apparatus main body 10 includes a base portion 11, a pair of columns 12, a beam 13, and a slider 14. The columns 12 are provided standing on the base portion 11 and capable of displacement in a Y axis direction. The beam 13 spans between the columns 12 in an X axis direction. The slider 14 is capable of displacement in the X axis direction on the beam 13. The slider 14 includes a ram 15 enabling displacement in a Z axis direction and the optical probe 2, which is similar to the above embodiment, is attachably and detachably provided to a forefront portion of the ram 15. In addition, the measuring apparatus 1A includes a Y drive mechanism driving the columns 12 in the Y axis direction, an X drive mechanism driving the slider 14 in the X axis direction, a Z drive mechanism driving the ram 15 in the Z axis direction, and an XYZ scale measuring a driving amount of the columns 12, slider 14, and ram 15 respectively.

Further, as shown in FIG. 6, the control device 6 includes various functional configurations: a probe displacer 61, a coordinate detector 62, the light source controller 561 having a similar function as in the embodiment above, the scanner controller 562, the shape analyzer 563, and the phase shift detector 564. In this example, the probe displacer 61 displaces the optical probe 2 by controlling the XYZ drive mechanisms. In addition, the coordinate detector 62 obtains a scale value detected by the XYZ scale and measures the coordinates (machine coordinate system) of the optical probe 2. In the measuring apparatus 1A of this example, similar to the embodiment above, the shape analyzer 563 detects the tilt angle θ of each of the mirrors 23A and 24A based on the electric signal from the detection coils 23D and 24D respectively, and in addition, calculates the coordinates of the scanning position based on the tilt angle θ, the scale value detected by the coordinate detector 62, and the measurement data (image data) from the optical probe 2.

In such a measuring apparatus 1A, the optical probe 2 is configured so as to move automatically. When the weight of the optical probe 2 is large, driving accuracy is reduced and a measuring error occurs. In contrast, similar to the above embodiment, the optical probe 2 is small in size and weight compared to the conventional optical probe using the galvano-motor, and therefore, the reduction of driving accuracy due to the weight load of the optical probe 2 can be inhibited and highly accurate measurement results can be obtained.

In addition, in step S3 in the embodiment above, an example is given in which the calibration process of step S3 is performed when there is a phase shift between the electric current signal from the first detection coil 23D and the electric current signal from the second detection coil 24D. However, the present invention is not limited to this. For example, when there is a phase shift between the electric current signals from the respective detection coils 23D and 24D, the process may return to step S2 and the synchronization process can be repeated by re-entering the drive command signal for the first driver 51 and the second driver 52. Furthermore, when there is a phase shift in the electric current signals after performing the synchronization process multiple times, an error can be output on the presumption that there is an abnormality in the resonant scanners 23 and 24.

In the above embodiment, an example is given of detecting the scanning position based on the electric current signal from the first detection coil 23D during measurement in step S5. However, the electric signal from the second detection coil 24D may be obtained and, in steps S9 and S10, the calculation of the tilt angle θ using the electric signal of the second detection coil 24D and the calculation of the coordinates of the scanning position may be performed. In addition, the calculation of the tilt angle θ and the calculation of the coordinates of the scanning position may be performed based on the electric signals of both the first detection coil 23D and the second detection coil 24D. For example, calculation of the tilt angle θ and calculation of the coordinates of the scanning position may be performed based on an average value of both electric signals.

In addition, during the measurement, the electric signals of both the first detection coil 23D and the second detection coil 24D can be obtained, and therefore the phase shift detector 564 may also detect the phase shift between the first mirror 23A and the second mirror 24A during the measurement. When the phase shift is detected, the calibration process may also be performed.

In the above embodiment, an example of the optical probe 2 provided with both the first detection coil 23D and the second detection coil 24D is described, however, a configuration is also possible in which only one of the coils is provided. In this case, the phase shift detector 564 may not be provided. Further, an exemplary configuration of a closed loop system is given in which the electric signals of the first detection coil 23D and the second detection coil 24D are input to the control device 5 and, based on these electric signals, the drive command signal for the first driver 51 and the second driver 52 is feedback controlled. However, an open loop system configuration may be used instead. In other words, a configuration may be used in which the first detection coil 23D and the second detection coil 24D are only used for detecting the scanning position, but not used in the feedback control. Furthermore, a configuration may be used in which the first detection coil 23D and the second detection coil 24D are not provided. In this case, the scanning position is calculated based on the measurement data.

In the above embodiment, the optical probe 2 was given as an example of a laser probe firing the laser light from the laser light source, however, a configuration may also be used in which light from another light source (such as an LED) is fired as parallel light by a collimator lens and the like. In the above embodiment, the multijoint arm 3 includes six links and joint portions and is configured to be operable with the six axes. However, the present invention is not limited to this and a configuration having another number of links and joint portions may be used and may be configured to be operable with five or seven axes.

In the above embodiment, an example is given of a configuration in which the first driver 51 and the second driver 52 are provided to the control device 5, however, a configuration may be used in which the first driver 51 and the second driver 52 controlling the alternating current flowing to the drive coils 23C and 24C are provided within the optical probe 2.

INDUSTRIAL APPLICABILITY

The present invention can be applied to an optical probe, firing light at a measured object and receiving light reflected by the measured object, and to a measuring apparatus having the optical probe.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An optical probe comprising:
    a light source that emits light towards a first resonant scanner;
    the first resonant scanner configured to receive the light emitted by the light source, and reflect the received light towards a target object to be measured, the first resonant scanner comprising
        a first mirror configured to rotate centered around a first drive axis, the first mirror being supported by a first beam, and
        a first drive coil configured to receive, from a control device, a first command signal; and
    a second resonant scanner configured to receive light reflected by the target object and reflect the light received by the second resonant scanner to a photo receiver, the second resonant scanner comprising
        a second mirror configured to rotate centered around a second drive axis, the first drive axis and the second drive axis being separate and coaxial, the second mirror being supported by a second beam, and
        a second drive coil configured to receive, from the control device, a second command signal,
    wherein the first mirror and the second mirror are configured to rotate and oscillate in synchronization,
    wherein the first command signal and the second command signal are simultaneously received by the first drive coil and the second drive coil, respectively, and
    wherein the synchronization of the first mirror and the second mirror is achieved by the first command signal and the second command signal being simultaneously received by the first drive coil and the second drive coil, respectively.

2. The optical probe according to claim 1, further comprising a tilt angle detector configured to detect a tilt angle of at least one of the first mirror and the second mirror.

3. The optical probe according to claim 2, wherein the tilt angle detector includes at least one of a first detection coil configured to output an electric current corresponding to the tilt angle of the first mirror and a second detection coil configured to output an electric current corresponding to the tilt angle of the second mirror.

4. The optical probe according to claim 3, wherein the tilt angle detector includes the first detection coil and the second detection coil.

5. A measuring apparatus comprising:
    the optical probe according to claim 1; and
    a measurer configured to perform a measurement based on a measurement result of the optical probe.

6. A measuring apparatus comprising:
    the optical probe according to claim 2; and
    a measurer configured to perform a measurement based on a measurement result of the optical probe.

7. A measuring apparatus comprising:
    the optical probe according to claim 3; and
    a measurer configured to perform a measurement based on a measurement result of the optical probe.

8. A measuring apparatus comprising:
    the optical probe according to claim 4; and
    a measurer configured to perform a measurement based on a measurement result of the optical probe.

9. The measuring apparatus according to claim 5, wherein:

the optical probe includes at least one of a first detection coil and a second detection coil, and the measurer is configured to detect a scanning position on the target object based on at least one of an electric current signal output from the first detection coil and an electric current signal output from the second detection coil.

10. The measuring apparatus according to claim 6, wherein:

the optical probe includes at least one of a first detection coil and a second detection coil, and the measurer is configured to detect a scanning position on the target object based on at least one of the electric current signal output from the first detection coil and the electric current signal output from the second detection coil.

11. The measuring apparatus according to claim 7, wherein:

the optical probe includes at least one of the first detection coil and the second detection coil, and the measurer is configured to detect a scanning position on the target object based on at least one of the electric current signal output from the first detection coil and the electric current signal output from the second detection coil.

12. The measuring apparatus according to claim 8, wherein:

the optical probe includes at least one of the first detection coil and the second detection coil, and the measurer is configured to detect a scanning position on the target object based on at least one of the electric current signal output from the first detection coil and the electric current signal output from the second detection coil.

13. The measuring apparatus according to claim 5, further comprising a phase shift detector configured to detect a phase shift of the first mirror and the second mirror based on each of an electric current signals output from a first detection coil and a second detection coil, wherein the optical probe includes the first detection coil and the second detection coil.

14. The measuring apparatus according to claim 6, further comprising a phase shift detector configured to detect a phase shift of the first mirror and the second mirror based on each of an electric current signals output from a first detection coil and a second detection coil, wherein the optical probe includes the first detection coil and the second detection coil.

15. The measuring apparatus according to claim 7, further comprising a phase shift detector configured to detect a phase shift of the first mirror and the second mirror based on each of the electric current signals output from the first detection coil and the second detection coil.

16. The measuring apparatus according to claim 8, further comprising a phase shift detector configured to detect a phase shift of the first mirror and the second mirror based on each of the electric current signals output from the first detection coil and the second detection coil.

17. The measuring apparatus according to claim 9, further comprising a phase shift detector configured to detect a phase shift of the first mirror and the second mirror based on each of the electric current signals output from the first detection coil and the second detection coil.

18. The measuring apparatus according to claim 10, further comprising a phase shift detector configured to detect a phase shift of the first mirror and the second mirror based on each of the electric current signals output from the first detection coil and the second detection coil.

19. The measuring apparatus according to claim 11, further comprising a phase shift detector configured to detect a phase shift of the first mirror and the second mirror based on each of the electric current signals output from the first detection coil and the second detection coil.

20. The measuring apparatus according to claim 12, further comprising a phase shift detector configured to detect a phase shift of the first mirror and the second mirror based on each of the electric current signals output from the first detection coil and the second detection coil.

21. The optical probe according to claim 1, wherein the second resonant scanner directly receives light reflected from the target object to be measured.

22. The optical probe according to claim 1, wherein the first resonant scanner directly reflects light towards the target object to be measured.

23. The optical probe according to claim 1, wherein light received by the second resonant scanner has been reflected more times than light received by the first resonant scanner.

* * * * *